Figure 2:
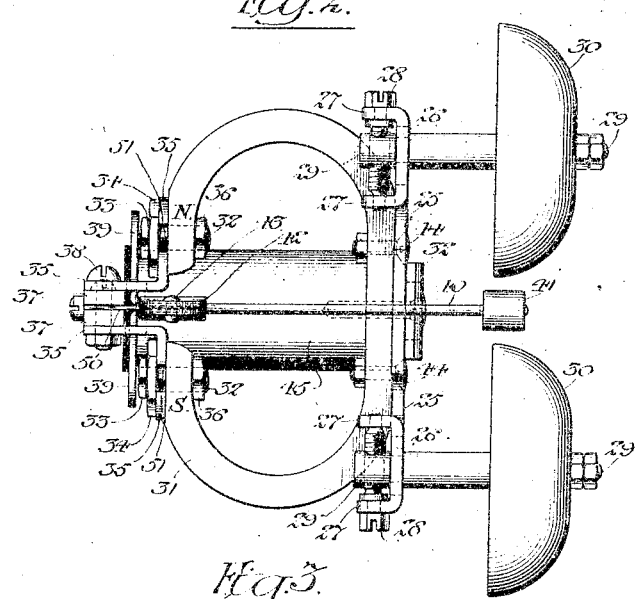

H. G. WEBSTER.
HARMONIC SIGNALING SYSTEM.
APPLICATION FILED MAR. 11, 1912.
1,090,435.
Patented Mar. 17, 1914.
2 SHEETS—SHEET 1.
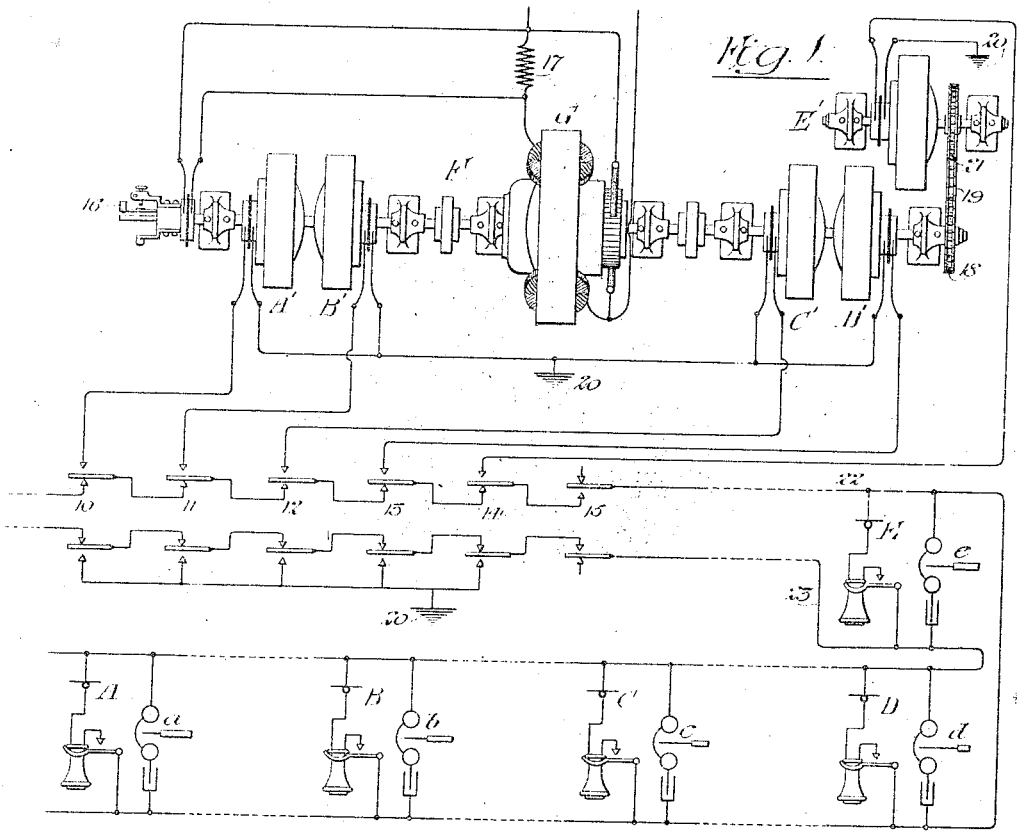
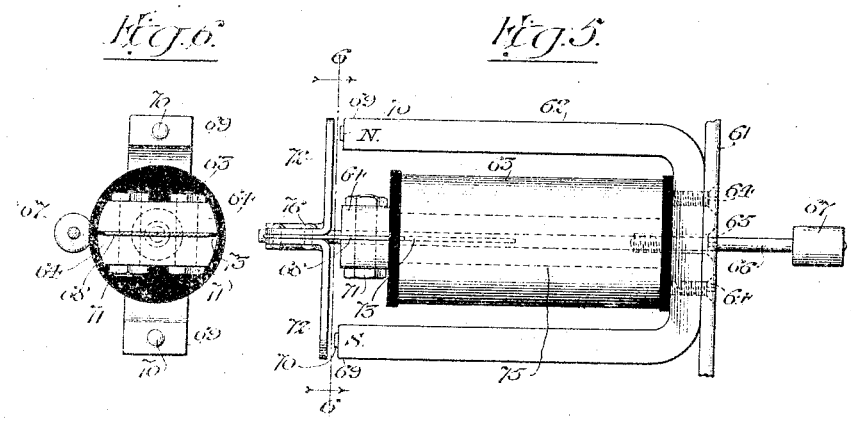
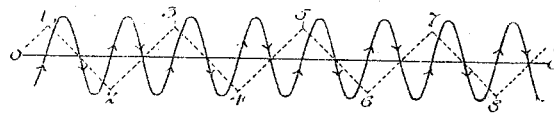

H. G. WEBSTER.
HARMONIC SIGNALING SYSTEM.
APPLICATION FILED MAR. 11, 1912.

1,090,435.

Patented Mar. 17, 1914.
2 SHEETS—SHEET 2.

Witnesses:
Louis M. Whitehead
J. H. Ferguson

Inventor
Harry G. Webster

UNITED STATES PATENT OFFICE.

HARRY G. WEBSTER, OF CHICAGO, ILLINOIS.

HARMONIC SIGNALING SYSTEM.

1,090,435.

Specification of Letters Patent. Patented Mar. 17, 1914.

Application filed March 11, 1912. Serial No. 682,994.

*To all whom it may concern:*

Be it known that I, HARRY G. WEBSTER, a citizen of the United States of America, and a resident of Chicago, county of Cook, and State of Illinois, have invented a new and useful Improvement in Harmonic Signaling Systems, of which the following is a specification.

My invention relates to so-called "harmonic" selective telephone signaling systems, and has for its object an organization having a new and improved method of operation over those of the prior art, whereby false signals are eliminated and greater efficiency is secured.

In prior systems, of which that disclosed in Patent No. 779,533, issued January 10, 1905, to W. W. Dean may be regarded as an example, the almost universal practice has been to employ a so-called multicycle generator for producing those electromagnetic impulses which serve to cause the actuation of the several party-line signal bells. This outfit consists of an electric motor, to the shaft of which are fixed a plurality of alternating current dynamos, all rotating at the same substantially fixed rate of speed. Four dynamos are commonly provided, having two, four, six and eight poles, respectively, and thus delivering currents having frequencies of 1000, 2000, 3000 and 4000 cycles per minute, when the speed is 1000 R. P. M. The reed-members of a set of four party-line bells in such a system are, therefore, adjusted for frequencies of approximately $16\frac{2}{3}$, $33\frac{1}{3}$, 50 and $66\frac{2}{3}$ cycles per second, respectively. As so arranged, current from the two-pole generator is intended to ring only the $16\frac{2}{3}$ cycle bell, that from the four-pole generator only the $33\frac{1}{3}$ cycle bell, that from the six-pole generator only the 50 cycle bell, and that from the eight-pole generator only the $66\frac{2}{3}$ cycle bell.

It is now generally recognized that systems like that of the patent above mentioned are not truly harmonically selective and non-interfering, and that instead each reed-member has an active tendency to respond harmonically not only to current from that generator for which it is adjusted, but also to currents from certain of the other generators of lower frequency. This characteristic is referred to in Patent No. 827,087, issued July 31, 1906, to W. V. Dean, in which it is proposed to overcome this interfering tendency by employing a different strength of current for each frequency; and in Patent No. 1,008,282, issued November 27, 1911, to C. H. North, in which it is proposed to avoid the interference by employing frequencies no one of which is a multiple of any other. Both proposed remedies are objectionable,—the first because of its marginal character, and the second because within a commercially operative range such non-multiple frequencies cannot be secured by means of four dynamos all connected to a common shaft and operating at the same speed of rotation.

The object of the present invention is to effect an organization in which, by reason of the employment of a new principle of operation, it is possible to operate the party-line bells by currents from generators all having the same speed of rotation, and yet without having present the interfering tendency above described. It will be more fully explained in connection with the accompanying drawings, in which—

Figure 3:
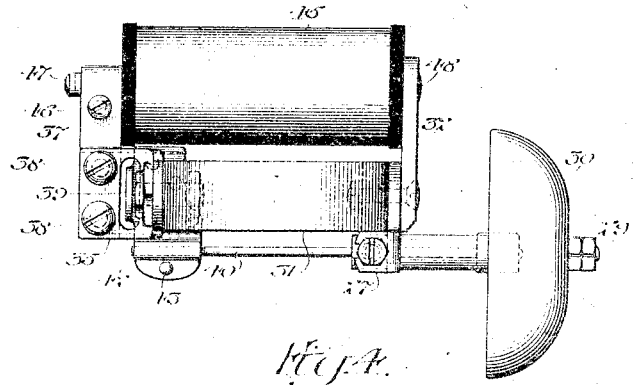
Figure 4:
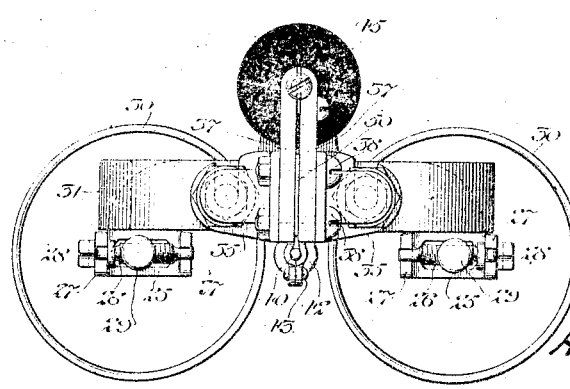

Figure 1 is a diagram of suitable electrical circuit connections for an embodiment of my invention, while Figs. 2, 3 and 4 are plan, side and end views, respectively, of one form of harmonic bell organized in accordance therewith. Figs. 5 and 6 illustrate a different arrangement of bell also organized in accordance with my invention, and F 7 is a diagram for illustrating the relation between impressed current and reed motion.

In the prior systems above described, the reed-member of each bell is inherently responsive not only to current of that frequency for which it has been adjusted, but also to currents which are one-half, one-third, or one-fourth of that frequency. Thus the reed-member of the $66\frac{2}{3}$ cycle bell responds to currents from the $16\frac{2}{3}$ cycle generator, the $33\frac{1}{3}$ cycle generator and the $66\frac{2}{3}$ cycle generator; the reed-member of the 50 cycle bell responds to currents from the $16\frac{2}{3}$ cycle generator and from the 50 cycle generator, while the reed-member of the $33\frac{1}{3}$ cycle bell responds to currents from the $16\frac{2}{3}$ cycle generator and from the $33\frac{1}{3}$ cycle generator. Investigation shows that the vibrations in response to such lower frequencies are true harmonic vibrations, gradually increasing in amplitude, and (in the absence of means for limiting the strength of the current impulses) causing a vigorous and continuing ringing of the associated bell-gongs. This characteristic of systems like that in question is to be attributed to the manner in which the polarized electromagnetic signal receiving devices are organized. In these devices, a polarized armature, forming a part of the reed-member of each bell, vibrates before or between the poles of an electromagnet energized by each frequency of signaling current that is impressed upon the line. It is a well recognized fact that if, when current is impressed upon a polarized device of this character, the armature be slightly off center, then the armature will be attracted toward that pole of the electromagnet to which it is nearest, regardless of the polarity of the impressed current impulse. Because of this, when current impulses of any frequency are impressed upon the line circuit in these prior systems, and each reed-member is set slightly in motion by the initial impulse, then each succeeding impulse produces a magnetic attraction coinciding in time and in direction with the natural motion of any reed-member adjusted for a frequency rate twice, three times, or four times, the impressed frequency rate. These attractions coincide with every second swing of the reed-member adjusted for twice the impressed rate, with every third swing of that adjusted for three times the rate, and with every fourth swing of that adjusted for four times the rate. In response to a succession of these coinciding attractions, each reed-member vibrates with an increasing amplitude limited only by the stiffness of the reed spring or by engagement with a stationary part of the device.

In the system of my present application, I so organize the polarized signal receiving devices that the magnetism set up by the impressed current impulses produces resultant forces acting upon the reed-tongue armature, always in one direction for impulses of one polarity, and always in the opposite direction for impulses of the other polarity. As a result, when current impulses of any frequency are impressed upon the electromagnet of such a device having its reed-member adjusted for twice the impressed rate, each resulting magnetic impulse may coincide in point of time with every second swing of the reed-member, but does not coincide in direction. On the contrary, each magnetic force pulsation coinciding in time and in direction with a swing of the reed-member is succeeded by a force pulsation coinciding in time with the second succeeding swing, but acting in direct opposition thereto. Consequently, every second pulsation acts to suppress and limit the amplitude of the reed vibration, and the device as a whole may be said to be harmonically unresponsive to current impulses of half the rate for which it is adjusted. This is a result which I believe to be broadly new in tuned reed bells.

With respect to the condition in my system under which the reed-member is adjusted for a rate four times the impressed rate, similar results are secured. A magnetic force impulse coinciding in time with every fourth swing of the reed-member, acts in direct opposition to such swing and serves to suppress and limit the amplitude of vibration. The action described in this and the preceding paragraph may be readily understood by reference to Fig. 7 of the drawings. In this figure, the spacing and direction of the reed vibrations is illustrated by the curved full line, while the broken line indicates the spacing and direction of the force pulsations resulting from an impressed current of one-half the frequency for which the reed-member is adjusted. As here indicated, every odd numbered pulsation acts in harmony with the reed motion, while every even numbered pulsation acts in direct opposition thereto.

Under the condition of impressed alternating current pulsations of a frequency one third of that for which the reed-member is adjusted, harmonic response seems inherent. Every swing of the reed is opposite in direction to the third preceding swing, while every current impulse is of opposite polarity to the immediately preceding impulse; and with coincidence in point of time between every impulse and every third swing, coincidence in direction of motion and of applied force necessarily follows. Operating under conditions necessarily involving magnetic leakage, and constantly changing inductance and magnetic permeability, it seems inevitable that devices of the class in question should respond harmonically under the assumed condition. This conclusion seems also true with respect to the impression of a rate one-fifth of that for which the reed-member is adjusted. To avoid such interference, I organize my improved system so that no one of the current rates employed shall be of a frequency exactly or approximately one-third or one-fifth that of any of the other current rates employed. If desired, the lowest rate employed may have a frequency greater than one-third the frequency of the highest rate employed, although this is not essential. For instance, the dynamos of the multi-cycle generator may be provided with four, six, eight and ten poles, respectively; or with six, eight, ten and twelve poles, respectively, operating in either case at a speed to bring the highest frequency within commercial limits. Also, if desired, one or more of the lower frequencies of the party-line system may be generated by a machine running at a speed different from that of the multi-cycle set used for giving the higher frequencies. For example, in accordance with my invention, complete harmonic non-interference may be secured employing for the higher frequencies a multi-cycle generator giving approximately 32, 48 and 64 cycles per second, and for the lowest frequency an auxiliary generator giving approximately 18⅔ cycles per second. I am not limited, however, to any particular choice of frequencies, for by means of my invention harmonic non-interference is readily possible using many other groups of frequencies than those indicated.

Referring now to Fig. 1, I have indicated at A, B, C, D and E the subscribers' stations of a party-line telephone system organized in accordance with my invention. These stations are associated by means of the line wires 22, 23, and the switches 10, 11, 12, 13, 14 and 15, with the generator set indicated at F. The generator set consists of a multi-cycle generator of the type disclosed in Patent No. 779,533 above mentioned, and of the auxiliary generator indicated at E'. The motor G is governed by means of the centrifugal switch 16 and the field circuit resistance 17, to operate at substantially constant speed, and is directly coupled to the alternating current dynamos A', B', C' and D'. Connected by means of chain and sprocket gearing 18, 19, 21, to the shaft of dynamos C' and D', the auxiliary dynamo E' is also driven by the motor G, but at a speed different from that of dynamos A', B', C' and D'. While I have illustrated the multi-cycle generator and the supplemental dynamo as connected by chain and sprocket gears, it will be understood that any connecting means may be employed suitable for maintaining a constant speed relation between the two machines. The switches may be of any suitable type, that at 15 serving to interrupt the circuit of the wires 22, 23, and to bring these wires into electrical association with the selecting switches 10, 11, 12, 13 and 14, which serve to directly establish connection with the dynamo generating that particular frequency which it is desired to impress upon the line. The several earth connections 20 are to be understood as indicating a suitable return connection between the several switches and the return side of the dynamos. As is well understood, this return connection may be a direct connection, or may be a connection involving the conductors leading to the central battery of a common battery system, as indicated in Patent No. 779,533. I have purposely omitted these and other details, such as actuating means for the several switches, the central office talking and signaling connections of the telephone line, means for intermittently interrupting the ringing current, etc., for my invention is applicable to any type of manual or automatic telephone system and the details of such applications are matters well understood by those skilled in the art. It will also be understood that at the substations, the condensers may be omitted, if desired, and that any suitable method of connecting the substation apparatus may be employed. The tuned reed-members of the several substation bells are indicated at $a$, $b$, $c$, $d$ and $e$, and are adjusted to respectively respond to the current frequencies generated by dynamos A', B', C', D' and E'. As illustrating suitable frequencies to be employed, the dynamos A', B', C' and D' may have four, six, eight and ten poles, respectively, operating at a speed to give approximately 26, 39, 52 and 65 cycles per second, in which case dynamo E' would be of any suitable design and speed to generate approximately 15 cycles or approximately 19⅗ cycles per second. Or the multi-cycle generator may be operated to give frequencies of 30, 45, 60 and 75 cycles per second, in which case the auxiliary dynamo E' might properly be a two or four pole machine, generating approximately 17½ or approximately 22½ cycles per second. It will be obvious that if the selective operation of but four stations is desired in the system, then either the auxiliary generator, or the ten pole generator (with the corresponding substation bell) may be omitted from either arrangement above outlined; and the speed of the dynamos and the corresponding reed adjustments may be varied as desired as long as the above indicated relative speed relation is maintained. As an example of such a modification, the ten pole generator D' and station D could be omitted, and generators A', B' and C' operated to give respective frequencies of 33⅓, 50 and 66⅔ cycles per second, in which case generator E' would preferably be operated to give a frequency of approximately 14 cycles or approximately 19½ cycles per second. It will be apparent from the above that the underlying principle of this phase of my invention is the avoidance of current rates which are exactly, or approximately, odd multiples, such as one-third or one-fifth of the frequency of any other rate.

Referring now to the mechanical structure of the tuned reed bell of my invention. Figs. 2, 3 and 4 illustrate one method of suitable embodiment. Fig. 2 is a plan view. Fig. 3 is a side view and Fig. 4 is a view of the armature end of the device. A mounting plate 25 is provided, slotted at 26, 26, for the reception of the gong posts 29, 29, and having turned up ears 27, 27, 27, 27, in which turn the adjustment screws 28, 28. These screws are threaded in the posts 29, 29, and serve to hold and move the posts in the slots 26 and thus adjust the gongs 30 with respect to the tapper weight 41. The curved permanent magnet 31 is secured to the mounting plate by bolts 44, 44, and has its opposite poles N, S, perforated for the reception of the soft iron bolts 32, 32, whose heads 33, 33, constitute adjustable pole-pieces for the permanent magnet. The armature consists of the two angular pieces 39, 39, between which is clamped one end of the leaf-spring 50. These two pieces are formed of soft steel or iron, with a channel at 42 for clamping the tapper rod 40, and are securely riveted together, as at 43. The other end of the leaf-spring is securely clamped between the soft iron blocks 37, 37, by means of the nonmagnetic angle pieces 35, 35, and bolts or rivets 38, 38. The pieces 35 are slotted at 51, 51, to receive the bolts 32, and when clamped against the ends of magnet 31 serve to rigidly support the armature 39, 39, at a fixed distance from the magnet ends. The non-magnetic nuts 34, 34, and iron nuts 36, 36, serve to hold the pieces 35, 35, in place; and also provide means for adjusting the bolt heads 33, 33, with respect to the armature 39, 39, and so varying the air gap for the armature. Air gap spacers of non-magnetic metal may be fixed in the armature or bolts, or these parts may be plated with copper if desired. The electromagnet 45 consists of a single spool having its core secured at one end to the ends of the pieces 37, 37, by means of the screws 47 and 46, and at the other end by the screw 48 to the soft iron piece 32 carried on the mounting plate 25. The electromagnet may be provided with any suitable winding, one such being of approximately 12,000 turns of No. 33 single silk covered copper wire, having a resistance of approximately 500 ohms. The structure is one having no break in the magnetic circuit of the permanent magnet or electromagnet, except at the operating air gap of the armature. When assembled as above, the entire device constitutes a rigid unitary structure in which the armature pieces 39, the leaf-spring 50, the rod 40 and tapper weight 41 constitute a reed-member, or reed-striker, having a characteristic rate of vibration. It is adjusted during assembly for currents of predetermined frequency by varying the operating air gap and the length and stiffness of the leaf-spring, and by varying the tapper weight with respect to its size and to its position on the tapper rod.

Figs. 5 and 6 illustrate another method of organizing the tuned reed bell of my invention, Fig. 5 being a partial plan view, and Fig. 6 a sectional end view on the line 6—6. The mounting plate 61 corresponds to plate 25 of Fig. 2 and is to be understood as adjustably supporting gong-posts and gongs in a similar manner. The permanent magnet 62 is secured to the plate 61 by bolts or screws 64, and between its two legs is mounted the electromagnet 63. The electromagnet core 75 is secured at one end to the plate 61 and magnet 62 by means of the screw 65, or in any other suitable manner; and the opposite end is provided with a slot 73, and enlarged portions 64, 64, for supporting the reed-member. This reed-member consists of the two soft iron armature pieces 72, 72, the tapper rod 66, the tapper weight 67, and the leaf-spring 68. One end of the tapper rod, and one end of the leaf-spring are rigidly clamped between the armature pieces 72, by means of rivets, as indicated at 76. The other end of the leaf-spring is rigidly supported in the slot 73, between the core portions 64, by means of rivets or bolts, as indicated at 71, 71. Non-magnetic stops may be provided, as indicated at 70, or in any suitable manner. The end portions 69, 69, of magnet 62, constitute opposite poles, and the electromagnet may have 8,000 or any other suitable number of turns in its winding. As so organized, the reed-member has a characteristic rate of vibration, the magnetic circuit is practically unbroken, except at the operating air gap which may be given a permanent adjustment, and the device as a whole is compact, rigid, efficient, and economical to manufacture.

With the construction of Fig. 2, or of Fig. 5, when alternating currents are impressed upon the electromagnet winding, the armature always receives an active magnetic polarity when current flows in one direction and an active and opposite magnetic polarity when current flows in the other direction. Thus, regardless of the position of the armature, the reed-member always receives an active stress in one direction in response to current impulses of one polarity, and an active stress in the other direction in response to current impulses of the opposite polarity. As thus organized, the present device has many advantages over prior tuned reed bells, aside from those advantages already pointed out. One characteristic of prior reed bells of the polarized type is found in the more or less well known fact that when impressing relatively strong current impulses of that frequency for which the bell is adjusted, if the bell armature be at that instant slightly vibrating, as from a previous ring, it will frequently fail to respond and ring the bell, and instead will vibrate continuously at small amplitude as long as the ringing circuit remains closed. This faulty operation seems to be due to the reed motion getting into and remaining in a phase relation with respect to the impressed current, under which it is displaced practically one hundred and eighty degrees from that phase relation under which its greatest amplitude of vibration can be secured. Its frequent occurrence is just as objectionable in practice as if the reed-tongue remained motionless. In the device of the present application, the characteristic just described is wholly absent; and instead the reed-member invariably and quickly assumes its full amplitude of vibration under all operative conditions. The device has an efficiency and a positiveness of operation not found in any prior devices of this art, so far as I am aware.

While I have illustrated my invention as applied to a party-line telephone system, I realize that it is applicable to other kinds of harmonic signaling systems and do not limit myself to its telephonic application.

While I have illustrated my invention by reference to certain particular signaling current frequencies, to particular means for generating these frequencies, and to particular mechanical arrangement of the devices acted on by these frequencies, I am not restricted to the embodiments here set forth, and desire to cover any and all methods of practising the invention.

Wherever in the following claims the phrase "harmonically unresponsive" is employed, it refers to that condition under which a reed-member has no tendency to increasing amplitude of vibration in response to a succession of impulses. Wherever in the following claims I have employed the term "net" stress or force, I wish it to be understood as referring to the resultant of a plurality of stresses or forces acting at any given instant.

All of the above statements as to operation, I have fully verified by actual tests. It may also be here pointed out that, in prior harmonic signaling systems employing multi-cycle generators, non-interference of signals depends upon adjustments of operating air-gap, reed stiffness and current strength. In the system of the present application, non-interference is secured by the avoidance of frequency rates which are odd numbered factors (as one-third or one-fifth) of the other rates employed; and by the employment of reed-bells inherently harmonically unresponsive to currents having frequency rates which are even numbered factors (as one-half or one-fourth) of the frequency rates for which they are adjusted.

I claim:

1. A harmonic signaling system comprising sources of alternating current of different frequencies in combination with selectively operated reed-bells having reeds respectively tuned to said frequencies and each of said bells having reed-actuating means, including a permanent magnet and an electromagnet, for causing net magnetic stresses corresponding to the direction and frequency of the impressed current impulses independently of the momentary positions of the reed, whereby the reed of one of said bells is brought into conjunctive phase relation with the impressed current to cause its operation and the reed of the other of said bells has its amplitude of vibration restricted to prevent its operation.

2. A harmonic signaling system comprising sources of alternating current of frequencies some of which bear a substantially even multiple relation to each other, in combination with selectively operated reed-bells each having reed-actuating means, including a permanent magnet and an electromagnet, for causing net magnetic stresses corresponding to the direction and frequency of the impressed current impulses independently of the momentary positions of the reed.

3. A harmonic signaling system comprising sources of alternating current of frequencies some of which bear a substantially even multiple relation to each other, in combination with a multiple station signaling circuit having at each station a reed-bell, the reeds of said bells being respectively tuned to respond to currents of said frequencies, and having at each of certain of said stations reed-actuating means, including the bell magnet and a permanent magnet, for causing net magnetic stresses corresponding to the direction and frequency of the impressed current impulses independently of the momentary positions of the reed.

4. A harmonic signaling party-line telephone system comprising central office apparatus producing signaling currents of frequencies approximately 33⅓, 50 and 66⅔ cycles per second, other apparatus producing signaling currents of a frequency substantially dissimilar to one-third the frequency of, and lower than, any one of the other frequencies, in combination with a multiple station telephone line having at each station a reed-bell, said bells being respectively tuned to respond to currents of said frequencies, and having at each of certain of said stations actuating means, including a permanent magnet and an electromagnet, for causing net magnetic stresses corresponding to the direction and frequency of the impressed current impulses independently of the momentary positions of the reed.

5. A harmonic signaling party-line telephone system comprising central office apparatus producing signaling currents of frequencies approximately 33⅓, 50 and 66⅔ cycles per second, and other apparatus producing signaling currents of a frequency substantially dissimilar to one-third the frequency of, and lower than, any one of the other frequencies, in combination with a multiple station telephone line having at each station a reed-bell, said bells being respectively tuned to respond to currents of said frequencies, and having at each of certain of said stations actuating means, including a permanent magnet and an electromagnet, responsive to the current of that frequency to which the particular device is tuned, to bring said reed always into conjunctive phase relation with the impressed current.

6. A harmonic signaling system comprising sources of alternating current of different frequencies in combination with selectively operated reed-bells having reed-armatures respectively tuned to said frequencies and each of said reed-bells having means, including a permanent magnet and an electromagnet, for producing alternating magnetic polarization of its reed-armature, whereby said reed-armature receives net magnetic stresses corresponding to the direction and frequency of impressed current impulses independently of the momentary positions of the reed-armature and whereby the reed-armature of one of said bells is brought into conjunctive phase relation with the impressed current to cause its operation and the reed-armature of the other of said bells has its amplitude of vibration restricted to prevent its operation.

7. A harmonic signaling system comprising sources of alternating current of frequencies some of which bear a substantially even multiple relation to each other, in combination with selectively operated reed-bells having reed-armatures respectively tuned to said frequencies and each of certain of said reed-bells having means, including a permanent magnet and an electromagnet, for producing alternating magnetic polarization of its reed-armature whereby the vibration of the reed-armature is dampened by currents of frequencies which are even submultiples of the frequency corresponding to the particular reed-armature.

8. A harmonic signaling system comprising sources of alternating current of frequencies some of which bear a substantially even multiple relation to each other, in combination with selectively operated reed-bells having reed-armatures respectively tuned to said frequencies and each of certain of said reed-bells having means, including an electromagnet and a permanent magnet having opposite poles positioned to act in opposite directions with respect to the motion of the associated reed-armature, for causing currents of frequencies which are even submultiples of the frequency corresponding to the particular reed-bell, to dampen the action of its reed at regular intervals to thereby prevent its operation.

9. A harmonic signaling system comprising sources of alternating current of frequencies some of which bear a substantially even multiple relation to each other, in combination with selectively operated reed-bells having reed-armatures respectively tuned to said frequencies and each of certain of said reed-bells having means, including an electromagnet of which its reed-armature is a polar extension, for causing currents of frequencies which are even submultiples of the frequency corresponding to the particular reed-bell, to dampen the action of its reed at regular intervals to thereby prevent its operation.

10. A harmonic signaling system comprising a source of alternating current in combination with two reed-bells having reed-members tuned to different rates and means for impressing magnetic stresses upon said reed-members corresponding to the direction and frequency of the impressed current impulses independently of the momentary position of the reed-members whereby the reed-member of one of said bells is brought into conjunctive phase relation with the impressed current to cause its operation and the reed-member of the other of said bells has its amplitude of vibration restricted to prevent its operation.

11. A harmonic signaling system comprising a tuned reed-striker having a characteristic rate of vibration, a source of alternating current of a frequency substantially the same as said characteristic rate, a second reed-striker tuned to a substantially different rate, and means for impressing upon said reed-strikers magnetic stresses corresponding in direction and frequency to the current alternations of said source independently of their momentary positions, whereby the maximum amplitude of vibration of the first mentioned reed-striker is effected to cause its operation and the amplitude of vibration of said second reed-striker is restricted to prevent its operation.

12. A harmonic party-line telephone system comprising central office apparatus producing signaling currents of frequencies, some of which bear an even sub-multiple relation to each other and none of which are odd submultiples of others, in combination with a multiple station telephone line having at each station a reed-bell, said bells being respectively tuned to respond to currents of said frequencies, and having at each of certain of said stations actuating means, including a permanent magnet and an electromagnet, for causing net magnetic stresses corresponding to the direction and frequency of the impressed current impulses independently of the momentary positions of the reed.

13. A harmonic signaling system comprising sources of alternating current of frequencies of which some bear a substantially even sub-multiple relation to each other, some are non-multiples of others and none are odd multiples of others, in combination with a multiple station telephone line having at each station a reed-bell, said bells being respectively tuned to respond to currents of said frequencies, and having at the higher tuned of those stations tuned to respond to the frequencies bearing the even multiple relation, actuating means, including a permanent magnet and an electromagnet, for causing net magnetic stresses corresponding to the direction and frequency of the impressed current impulses independently of the momentary positions of the reed.

14. A harmonic signaling system comprising sources of alternating current of frequencies of which some bear a substantially even sub-multiple relation to each other, some are non-multiples of others and none are odd multiples of others, in combination with selectively operated reed-bells, of which the higher tuned of those bells corresponding to the frequencies bearing the even multiple relation, has reed-actuating means for causing net magnetic stresses corresponding to the direction and frequency of the impressed current impulses independently of the momentary positions of the reed.

15. A harmonic signaling system comprising sources of alternating current of frequencies of which some bear a substantially even sub-multiple relation to each other, some are non-multiples of others and none are odd multiples of others, in combination with a plurality of reed-bells having reed-members tuned respectively to said frequencies, and means associated with the higher tuned of those reed-members which are tuned to the even multiple frequencies for impressing magnetic stresses upon said reed-members corresponding to the direction and frequency of the impressed current impulses independently of the momentary position of said reed-members, whereby whenever current of a frequency suited to one of said even multiple reed-members is impressed, said reed-member is brought into conjunctive phase relation with the current to cause the operation of its bell and the remaining even multiple reed-members are restricted in vibration to prevent the operation of their bells.

16. A harmonic signaling system comprising sources of alternating current of frequencies of which some bear a substantially even multiple relation to each other, some are non-multiple of others and none are odd multiples of others, and selectively operated reed-bells respectively tuned to said frequencies and responsive only to their respective frequencies.

In witness whereof, I hereunto subscribe my name this 9th day of March, 1912.

HARRY G. WEBSTER.

Witnesses:
CAROLYN WEBER,
T. H. FERGUSON.